June 4, 1946.  F. R. BERNE  2,401,541
FILM HOLDER
Filed Dec. 13, 1944
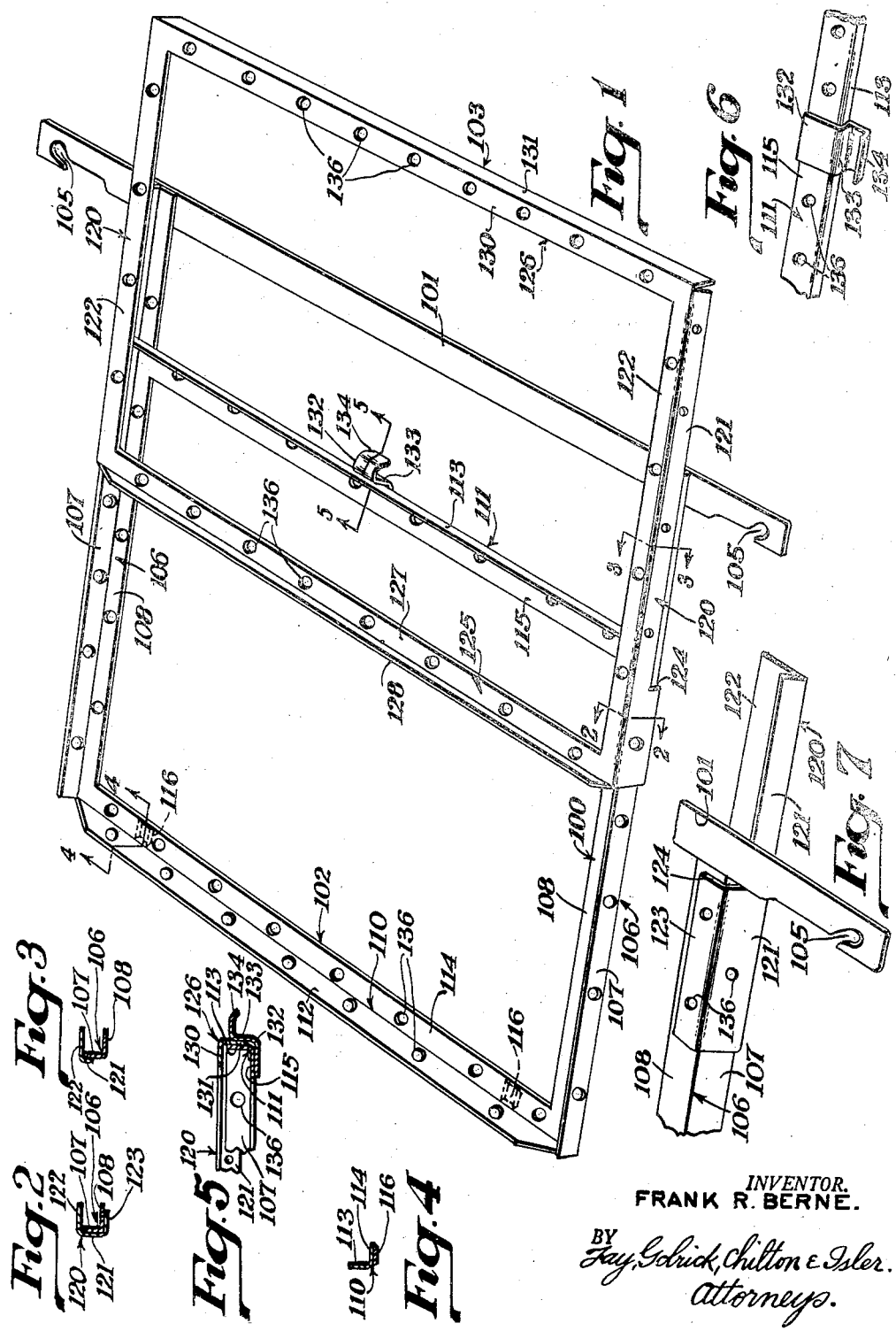
INVENTOR.
FRANK R. BERNE.
BY Fay, Gdrick, Chilton & Isler.
Attorneys.

Patented June 4, 1946

2,401,541

UNITED STATES PATENT OFFICE 2,401,541

FILM HOLDER

Frank R. Berne, Cleveland, Ohio

Application December 13, 1944, Serial No. 567,943

5 Claims. (Cl. 95—100)

The present invention relates to a film holder and more particularly to a holder for suspending sheet film in various solutions and for drying the film during the processing thereof so that the film need not be touched during the development process.

An object of the invention is to provide a holder by which a flat sheet of film can be suspended in the processing solutions so that every part of the film will be subjected to the solutions.

Another object of the invention is to provide a film holder by which the film can easily be inserted and removed from the holder.

A further object of the invention is to provide a film holder comprising an open frame in which a flat film may be placed and which frame may be closed by a cover slidably mounted on the frame, the cover being so mounted that it is slidable with a minimum of friction.

Other objects and advantages of the invention will be apparent from the following description of preferred forms of the invention, reference being had to the accompanying drawing wherein:

Fig. 1 is a perspective view of a form of film holder embodying the invention;

Fig. 2 is a view in section taken on the line 2—2 of Fig. 1;

Fig. 3 is a view in section taken on line 3—3 of Fig. 1;

Fig. 4 is a view in section taken on line 4—4 of Fig. 1;

Fig. 5 is a view in section taken on line 5—5 of Fig. 1 but with the cover of the holder in the closed position;

Fig. 6 is a fragmentary view of the opposite side of the film holder shown in Fig. 1 showing the latch member for the cover; and Fig. 7 is a fragmentary view of the opposite side of the film holder shown in Fig. 1 but on a larger scale showing the stop for the cover.

Referring to Fig. 1. I have shown one form of the invention embodied in film holder 100. This film holder comprises a support beam 101, a frame 102 for supporting a flat film, and a cover 103 slidable over the frame for holding the film in the frame.

The support beam 101 is provided with notches 105 at opposite ends thereof whereby the film holder may be suspended in a tank of solution by parallel rods received in the respective notches.

The frame 102 includes two side members 106 which are L shape in cross section for providing side walls 107 and film supporting flanges or webs 108. The members 106 are secured, as by solder or welding, to the beam 101. Interconnecting the members 106 are cross pieces 110 and 111, which pieces are also L shape in cross section for forming frame walls 112 and 113 and film supporting webs 114 and 115. Preferably, the web 114 is provided with two spaced projections 116 extending from the outer surface thereof for spacing the frame from the surface of a table, or the like, when the frame is laid thereon. The frame may be formed by separate members joined by solder or welding, for example, or it may comprise one piece formed by stamping and bending.

The cover 103 comprises side members 120 which are generally L shape in cross section for forming guide flanges 121 and film retaining webs 122. Flanges 122 overlie the upper edges of side walls 107 of the frame 102 and flanges 121 lie alongside the outside of walls 107 and guide the cover along the members 106 so that the cover 103 may be slidingly moved over and to one side of the frame 102. A portion of the flanges 121 of both members 120 adjacent the left hand ends thereof, as viewed in Fig. 1, are extended and turned inwardly with respect to the cover so that a portion 123 of each flange 121 extends alongside the outside surface of webs 108. As may be seen in Figs. 2 and 7, the portion 123 of the flanges slidingly secures the members 120 to the frame members 106. Also, the edges 124 of the portions 123 form stops which engage the beam 101 for limiting sliding movement of the cover to one side of the frame.

The members 120 are interconnected by crosspieces 125 and 126 so that the pieces 125 and 126 register with the frame pieces 110 and 111, respectively, when the cover is moved to the lefthand side of the frame, as viewed in Fig. 1. The piece 125 is L-shape in cross section for forming a film retaining web 127 and a strengthening flange 128. The flange 128 extends upwardly, as viewed in Fig. 1, so that it lies adjacent to the frame wall 112 when the cover is in the closed position, and, preferably the flange 128 does not extend flush with the wall 112 so that the frame wall 112 may be held by the fingers without interfering with the sliding of the cover to the frame closing and opening positions. The cross piece 126 is also L shape in cross section for forming a film retaining web 130 and a strengthening flange 131. When the cover is in the frame closing position, the flange 131 lies along the outside of frame wall 113. It is apparent that when the cover 103 is moved to the frame closing position, i. e., to the lefthand end of the frame, as viewed in Fig. 1, the retaining webs 122, 127 and 130 will cooperate with the side walls 107, 113 and 115 and webs 108, 114 and 115 for retaining a flat film loosely within the frame 102.

Preferably, a latch 132 is provided for frictionally retaining the cover 103 in the frame closing position. The latch 132 is formed of resilient material and is secured to the cross piece 111 on the outer surface thereof and a portion 133 thereof extends substantially parallel to the outside of frame wall 113 and is spaced slightly therefrom so that the flange 131 of the cover 103 may be received between the portion 133 and the outer surface of wall 113. A sloping or camming surface 134 extends outwardly from portion 133 of the latch for cooperating with flange 131 to depress the latch cam and to move the piece 126 of the cover over the cam when the cover is moved to its closing position. As the cover 103 is not secured to the frame members 106 adjacent cross piece 126 this end of the cover may be sprung over the latch cam. The cover is released by depressing the latch cam surface.

Preferably, openings indicated at 136 are formed in the frame and cover for permitting free flow of liquids about the edges of the film in the holder.

By sliding the cover 103 on the edges of walls 107, the friction between the frame and cover is reduced to a minimum and there is less likelihood of the guide for the cover to be inadvertently damaged or deformed than with a wider and flat guide.

Although the embodiments of the holder shown in the drawing are made of sheet metal, they could be formed of any suitable material, such as, for example, plastics.

Having described preferred forms of embodiments of my invention, it is to be understood that other forms of the invention may be adopted, falling within the scope of the claims as follows:

I claim:

1. A film holder comprising a frame for receiving a film, said frame including, a support beam; a pair of frame members attached to said beam and extending from one side thereof, said members having web portions extending inwardly toward one another and forming a support for a film in the frame and thin wall portions extending at right angles to said webs for forming side walls of the frame; and a cover for said frame including a pair of members overlying the edges of said wall portions, respectively, and slidable along said edges, at least one of the last mentioned members having a flange portion thereof extending alongside said wall portions and in alignment with said beam whereby said flange portion is engageable with the beam for limiting movement of the cover in one direction.

2. A film holder comprising a rectangular frame for receiving a film, said frame including two oppositely disposed side members formed of sheet-like material and each having a laterally extending web for supporting an edge portion of a film and having a thin wall portion extending at substantially right angles to said web for retaining said film in the frame; and a cover for said frame, said cover including two oppositely disposed members formed of sheet-like material and each having a web overlying the edges of said walls, respectively, and slidable thereon, and a guide flange extending from each of the last mentioned webs alongside the outer surfaces of said wall portions for guiding said cover along the first-mentioned two members.

3. A film holder comprising a rectangular frame for receiving a film, said frame including two oppositely disposed members formed of sheet-like material and each having a laterally extending web for supporting an edge portion of a film and having a thin wall portion extending at substantially right angles to said web for retaining said film in the frame; and a cover for said frame, said cover including two oppositely disposed members formed of sheet-like material and each having a web overlying the edges of said walls, respectively, and slidable thereon, and a guide flange extending from each of the last mentioned webs alongside the outer surfaces of said wall portions and alongside the outer surfaces of the first mentioned webs for guiding said cover along the first mentioned two members and for retaining said cover in sliding relation with said frame.

4. A film holder comprising, an open, rectangular frame adapted to support the edge portions of a film or plate therein, two opposite frame members of said frame forming slideways for a cover and extending beyond one side of said frame; an open, rectangular cover adapted to be in registration with said frame when in the covering position, said cover having two opposite cover members thereof lying along and in sliding engagement with the said two frame members and being slidable therealong into and out of covering relationship with said frame, said two opposite cover members each including a flange extending along the outside of said two opposite frame members, respectively, for guiding the cover on said two frame members; a latch mounted on said one side of said frame, said latch having an abutment projecting in the normal path of movement of a side member of the cover, when said cover is slid on said frame, for normally retaining said cover in registration with said frame; and means confined adjacent to the side of said cover opposite said one side thereof for retaining said cover in relatively close relation with said two frame members whereby said one side of the cover may be moved outwardly from said frame and out of engagement with said latch abutment without disengaging the cover from the frame.

5. A film holder comprising an open, rectangular frame adapted to support the edge portions of a film or plate therein, said frame including two opposite side members adapted to form slideways for a cover, said side members extending beyond one side of said frame; a support beam interconnecting said extended side members; an open, rectangular cover adapted to be slid into registration with said frame for closing said frame, said cover including two opposite side members slidable on the upper surfaces of said side members of said frame; a latch on said one side of the frame, said latch having an abutment projecting from said frame for engagement with a corresponding side of said cover, when the cover is in its frame closing position, for retaining said cover in closed position; and means for securing said cover to said frame comprising, a flange on each of said two side members of said cover, said flanges extending alongside the side of the two side members of said frame, respectively, and overlying a portion of the underside of said two side members of said frame, respectively, said flanges extending along said undersides adjacent to the side of said frame opposite said one side whereby said one side of said cover may be moved outwardly from said abutment without disassociating said cover from said frame, said flanges being engageable with said beam after said cover is slid to the frame opening position.

FRANK R. BERNE.